United States Patent [19]

Matthews

[11] Patent Number: 4,945,788

[45] Date of Patent: Aug. 7, 1990

[54] ADJUSTABLE-MID-SPAN STRIPPER FOR WIRE AND CABLE

[75] Inventor: James J. Matthews, East Haddam, Conn.

[73] Assignee: Ripley Company, Inc., Cromwell, Conn.

[21] Appl. No.: 466,239

[22] Filed: Jan. 17, 1990

[51] Int. Cl.⁵ .............................................. H02G 1/12
[52] U.S. Cl. .......................................... 81/9.4; 30/90.1
[58] Field of Search ........................ 81/9.4, 9.44, 9.42; 30/90.1

[56] References Cited

U.S. PATENT DOCUMENTS

| | | | |
|---|---|---|---|
| 3,204,495 | 9/1965 | Matthews | 30/90.1 |
| 3,361,015 | 1/1968 | Matthews | 81/9.44 |
| 3,398,610 | 8/1968 | Matthews | 81/9.1 |
| 3,572,189 | 3/1971 | Matthews | 81/9.44 |
| 3,869,791 | 3/1975 | Horrocks | 81/9.42 |
| 3,978,582 | 9/1976 | Maytham | 81/9.44 |

FOREIGN PATENT DOCUMENTS 2133637 7/1984 United Kingdom ................... 81/9.4

Primary Examiner—Roscoe V. Parker
Attorney, Agent, or Firm—DeLio & Associates

[57] ABSTRACT

A tool for removing insulation from mid-span of a conductor cable which includes a frame with first and second jaw members, one of which is slidably mounted on the frame to close and cooperate with the other jaw member to secure cable in the tool for rotation of the frame relative to the cable. A circular ringing knife blade assembly is slidably mounted on the frame for movement toward and away from cable secured in the jaw members and upon extension of the circular knife blade and at least one full rotation of the frame in a first direction relative to the cable, the circular knife blade scores the jacket along a closed cut around the complete periphery of the cable. An insulation stripping assembly includes at least one blade edge for removing the radial thickness of the insulation from the cable. The blade edge is at a constant, fixed cutting angle and is mounted for movement along a straight line toward and away from the cable. An adjustable depth-limiting menas sets the maximum extension of the blade edge. Upon rotation of the tool frame in a second direction opposite the first direction relative to the cable, the blade edge cuts and lifts the insulation from the cable conductor. A second blade edge is mounted adjacent the first blade edge to cut the jacket in a helical direction and helically strip the insulation as the frame is rotated about the cable.

20 Claims, 5 Drawing Sheets

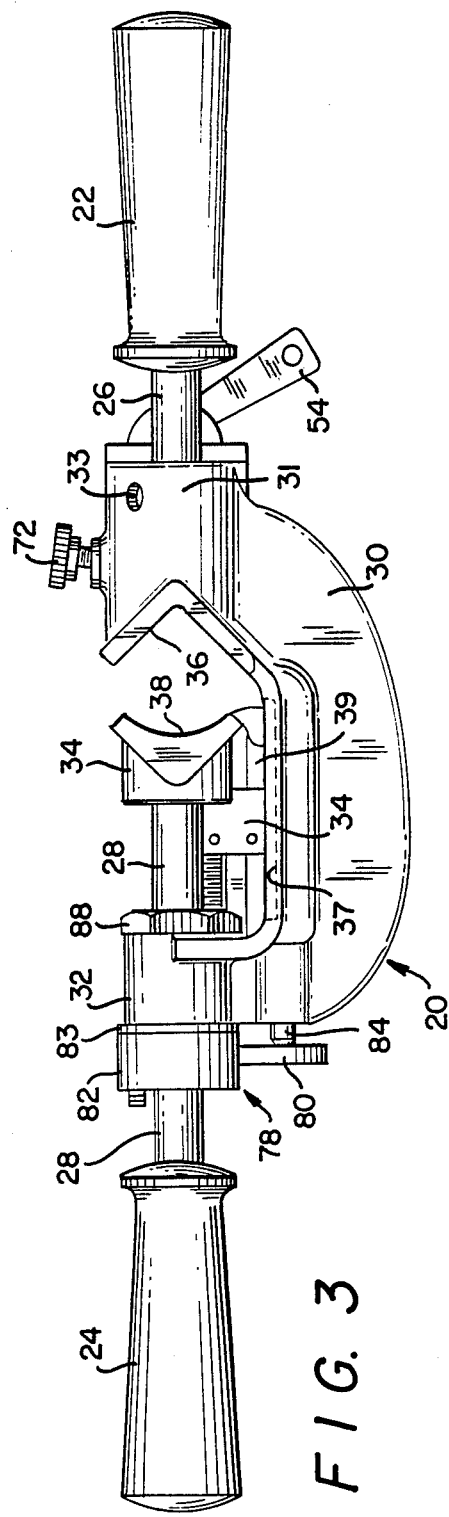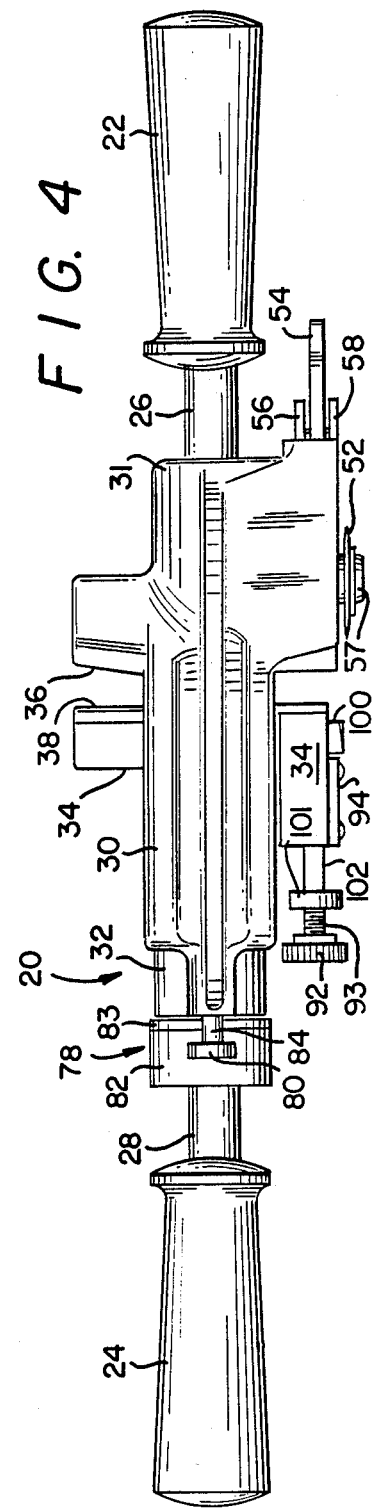

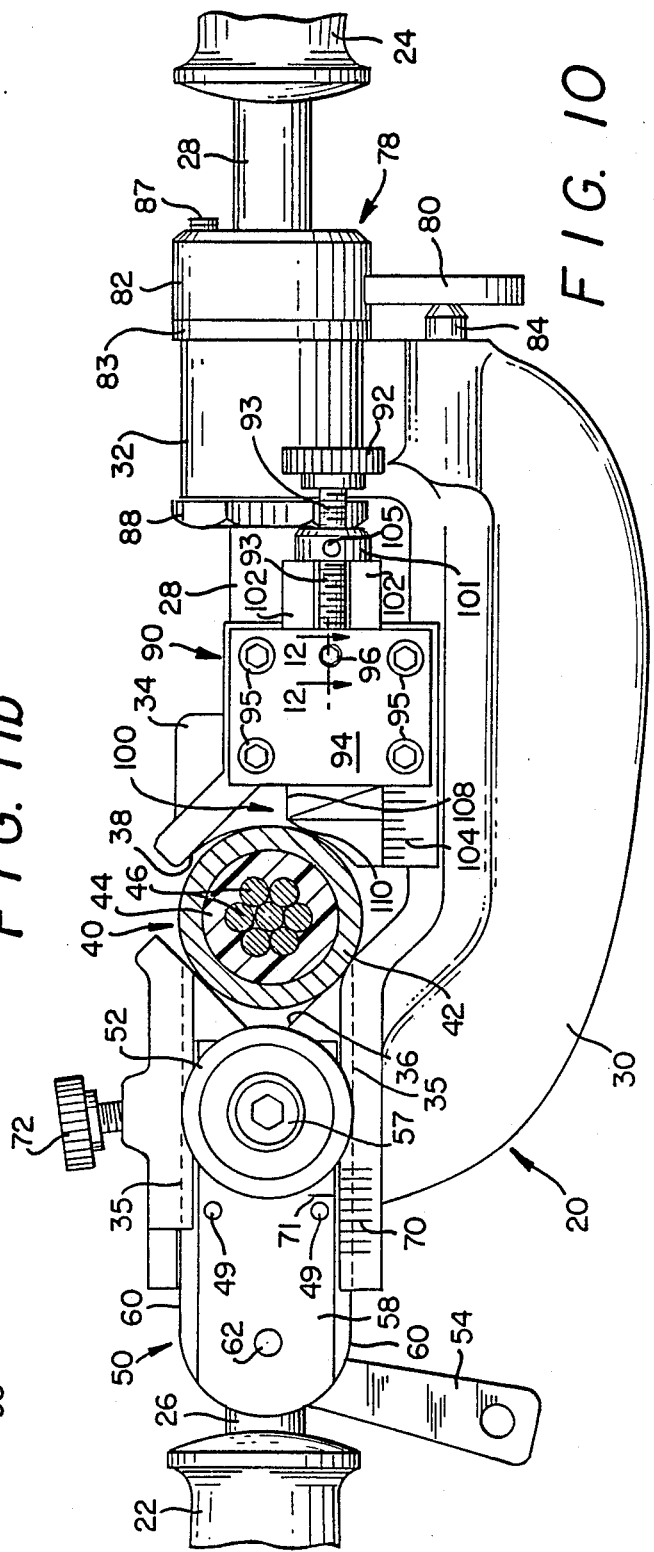
FIG. 10
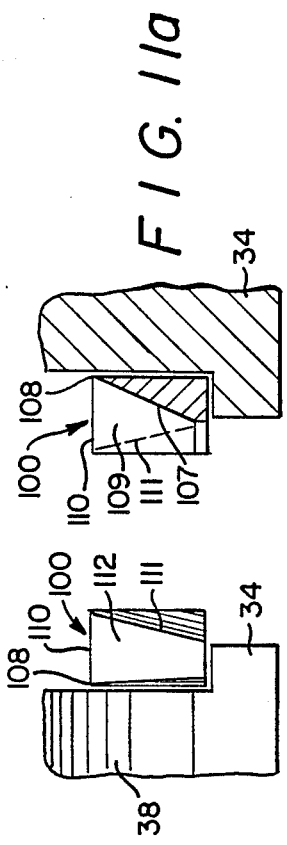
FIG. 11a
FIG. 11b
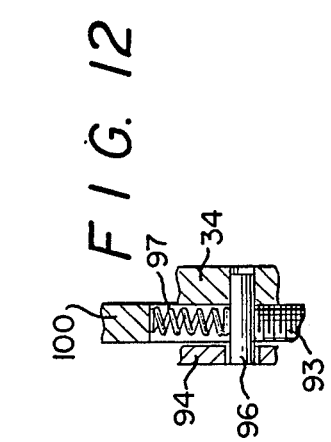
FIG. 12

ADJUSTABLE-MID-SPAN STRIPPER FOR WIRE AND CABLE

BACKGROUND OF THE INVENTION

The present invention relates to a tool for stripping insulation from electrical wire and cable and, in particular, to a hand tool which incorporates a circular ringing knife blade and a separate stripping or shaving blade to remove insulation in the mid portion of a span of wire or cable of various diameters.

Among the many known cable insulation shaving or stripping tools are those disclosed in U.S. Pat. Nos. 3,204,495, 3,361,015, 3,398,610 and 3,572,189 to the inventor of the present application. These tools generally utilize a pivoting stripping or shaving blade which helically strips the cable insulation as the tool is rotated around the cable. The angle of the pivotal stripping blade changes with respect to the cable as a function of the depth of cut, thereby resulting in varying blade angles for different size cables or different depths of cut. Although such tools can be utilized in stripping a section of insulation in an intermediate portion of the span of the wire or cable, it is desirable to provide a tool which is more easily grasped by the user and able to quickly adjust to different diameter cables and depth of cut to more effectively strip mid-span cable insulation.

Bearing in mind the deficiencies of the prior art and need for improvement, it is therefore an object of the present invention to provide an insulation stripping tool for wire and cable which is especially adapted for quick and easy removal of a portion of the cable insulation intermediate the cable ends.

It is another object of the present invention to provide a hand-held and operated tool for mid-span stripping of wire and cable which permits accurate preselection of stripping depth.

It is a further object of the present invention to provide a mid-span insulation stripping tool which provides effective engagement of blade cutting edges during operation.

It is yet another object of the present invention to provide a mid-span insulation stripping tool which utilizes a constant, fixed cutting angle for the insulation stripping blade.

It is a further object of the present invention to provide a mid-span insulation stripping device which meets the aforementioned objects and is usable on wire or cable of varying diameter.

SUMMARY OF THE INVENTION

The above and other objects, which will be apparent to those skilled in the art, are achieved in the present invention which provides a tool for removing insulation from conductor cable which includes a frame with first and second jaw members, with at least one of the jaw members being slidably mounted on the frame to close and cooperate with the other jaw member to secure cable in the tool for rotation of the frame relative to the cable. A ringing knife assembly is slidably mounted on the frame for movement toward and away from cable secured in the jaw members and includes means for releasably securing the ringing knife assembly in a fixed position relative to the frame. The ringing knife assembly further includes means for extending and retracting a circular knife blade from and to the assembly in its fixed position. Upon closure of the jaw members about a section of cable, the ringing knife assembly may be secured in a fixed position with a circular blade in a retracted position adjacent to the cable jacket. Upon extension of the circular knife blade and at least one full rotation of the frame in a first direction relative to the cable, the circular knife blade scores the jacket along a closed cut around the complete periphery of the cable.

An insulation stripping assembly on the frame includes at least one blade edge for removing the insulation from the cable. The blade edge is at a constant, fixed cutting angle and is mounted for movement along a straight line toward and away from the cable. An adjustable depth-limiting means sets the maximum depth of the blade edge. Upon rotation of the tool frame in a second direction, opposite the first direction, relative to the cable, the blade edge will lift and cut the insulation jacket from the cable to the desired depth set by the depth limiting means. Preferably, a spring urges the blade edge toward the cable such that cutting and lifting occurs automatically upon rotation in the second direction. A second blade edge is mounted adjacent the first blade edge to cut the jacket in a helical direction and helically strip the shaved insulation as the frame is rotated about the cable.

The ringing knife assembly may be located adjacent one of the first or second jaw members and the insulation jacket shaving assembly may be located adjacent the other of the first or second jaw members. Opposed first and second handle members may extend outwardly from the first or second jaw members, respectively. Releasable locking means or the second handle member permits the first and second handle members to be grasped and moved toward each other to close and lock the jaw members around the cable for scoring and/or shaving the cable insulation. A finger actuated lever which is operable while a user is grasping the handle members may be provided to move the circular knife blade between retracted and extended positions. Upon release of the handle locking means, the handle members may be grasped and pulled away from each other to open the jaw members and release the cable upon completion of the scoring and/or shaving operations.

BRIEF DESCRIPTION OF THE DRAWINGS

FIG. 3 is a rear elevational view of the stripping tool depicted in FIG. 1. FIG. 4 is a bottom plan view of the stripping tool depicted in FIG. 1.

FIG. 10 is an enlarged view of the central portion of the tool depicted in FIG. 1 with an electrical cable secured within the jaw members.

FIG. 11a is a cross sectional view of a portion of the insulation stripping assembly along lines 11a—11a shown in FIG. 9.

FIG. 11b is a view of a portion of the insulation stripping assembly along the line 11b—11b shown in FIG. 9.

FIG. 12 is a cross sectional view of a portion of the spring and depth limiting mechanism of the insulation stripping assembly along the line 12—12 shown in FIG. 10.

DETAILED DESCRIPTION OF THE INVENTION

Figure 1:
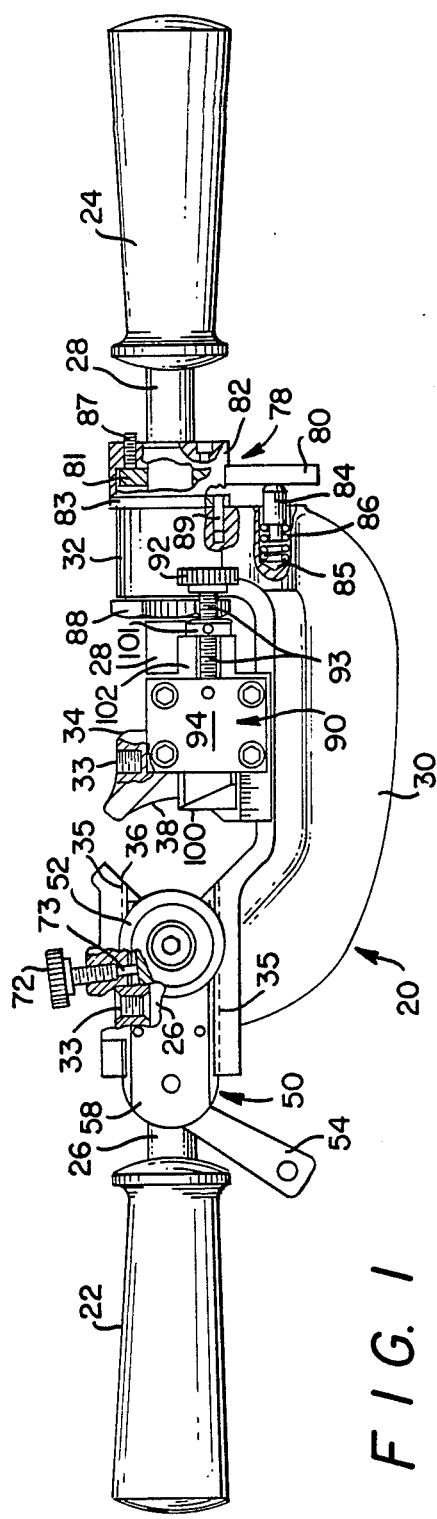
FIG. 1 is a front elevational view, partially cut away and partially in section, of the preferred embodiment of the adjustable mid-span insulation jacket stripping tool of the present invention.
Figure 2:
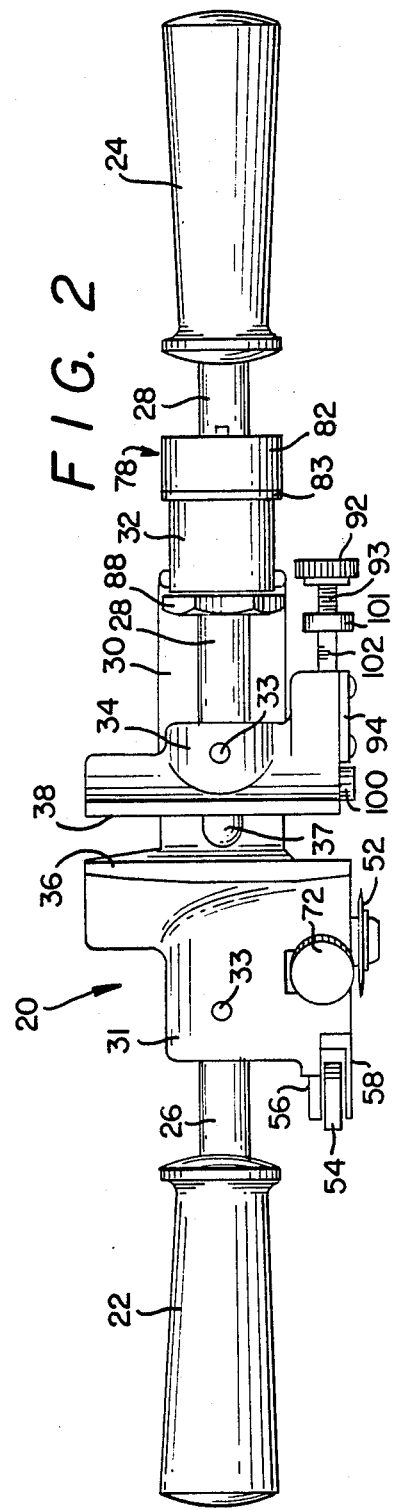
FIG. 2 is a top plan view of the stripping tool depicted in FIG. 1.

Reference will be made herein to the preferred embodiment of the mid-span cable insulation stripping tool of the present invention as depicted in FIGS. 1-12 of the accompanying drawings. Like numeral refer to like features of the invention throughout the drawings.

The preferred hand tool 20 of the present invention includes a "U" or "C"-shaped cast alloy frame or body 30 and a pair of opposed handles 22, 24 for grasping and operating the tool. An elongated shaft 26 connects handle 22 to the shaft mounting portion 31 of frame 30. Set screw 33 in the shaft mounting portion 31 of frame 30 secures shaft 26 and handle 22. An elongated shaft 28 is connected at one end to handle 24 and extends through the bore of shaft guide portion 32 of frame 30. The opposite end of shaft 28 is secured to an adjustable frame or body member 34 which slides along guide member 39 received within channel 37 set in frame 30. Set screw 33 in the adjustable frame portion 34 secures shaft 28 and handle 24.

To receive and secure electrical wire or cable 40 (see FIG. 10) there are provided opposed jaw faces 36 (integral with frame 30) and 38 (integral with adjustable frame member 34). The generally "V"-shaped face of jaw member 36 and the generally "U" or "C"-shaped face of jaw member 38 are of suitable size to secure various diameters of wire or cable therebetween. When the jaw members 36 and 38 close around a wire or cable, as shown in FIG. 10, the elongated handles 22, 24 and their respective shafts 26, 28 are coaxial with a line perpendicular to and extending through the longitudinal axis of the wire or cable 40. As used herein, the terms "cable" and "wire" are used interchangeably, unless otherwise noted. Cable 40 consists of a plurality of conductors 46 within an inner insulation 44 which in turn is surrounded by a semiconductive outer jacket 42. Jacket 42 and inner insulation 44 make up the insulation to be stripped by tool 20.

To tightly secure the wire or cable between and within jaw members 36, 38, handles 22 and 24 are grasped by the user and pushed toward one another to move the respective jaw members together. The position of the adjustable frame member 34 ma be fixed relative to frame 30 by a locking mechanism shown generally as 78. The locking mechanism consists of a sleeve 83 extending through the bore of shaft guide 32 and secured by a nut 88 and roll pin 89 as shown. Shaft 28 extends through a bore in sleeve 83 and an opening in end cap 82 secured to sleeve body 83. A ring member 81 is held in position by set screw 87 in cap 82 and includes an integral lever arm 80 extending downwardly through an opening in cap 82. A cylindrical plunger 84 received within bore 85 in frame 30 is urged or biased by spring 86 against the lever arm 80 to cock the ring member 81 against shaft 28. This arrangement permits shaft 28 to be slid within the bore of sleeve 83 to move adjustable frame member 34 and close jaw member 38 against jaw member 36 when plunger 84 is spring loaded outward against lever arm 80, but prevents reverse movement opening jaw member 38. However, when lever arm 80 is pushed to compress spring 86, such as by grasping handle 24 and pushing with the thumb against lever arm 80, shaft 28 may easily slide outward to open jaw members 36 and 38 to permit cable to be inserted or removed from the tool.

A circular or ringing knife blade assembly 50 is slidably mounted in frame 30 adjacent to jaw member 36 to score the periphery of insulation on cable secured within the jaw members. The ringing knife assembly 50 is shown in more detail in FIGS. 5-8 and includes an assembly housing 56 having a pair of integral straight flanges 60 which are slidingly received within corresponding slots 35 in frame 30 for movement of the assembly 50 toward and away from the cable. A flat cover plate 58 is secured by screws 49 over the housing 56 and includes a visible mark or indicia 71 which may be used in conjunction with indicia 70 on frame 30 to locate or relocate the relative position of the ringing knife blade assembly 50 with respect to the frame (see FIG. 10).

Circular knife blade 52 is secured by a screw button 57 and washer 53 to a threaded opening 69 in a holder member 65 which slides within the interior space between housing 56, housing side walls 63 and cover plate 58. Circular knife blade 52 is located in a plane perpendicular to the longitudinal axis of cable held within the tool jaw members and is provided to score the cable insulation jacket around the periphery of the cable as the tool is rotated relative to the cable.

A knob 72 having a threaded shaft received within a correspondingly threaded opening in frame 30 may be tightened to bear against pin 73, which in turn bears against the ramped indentation 55 in circular knife blade assembly 50 to secure the housing 56 in a fixed position relative to frame 30.

Figure 5:
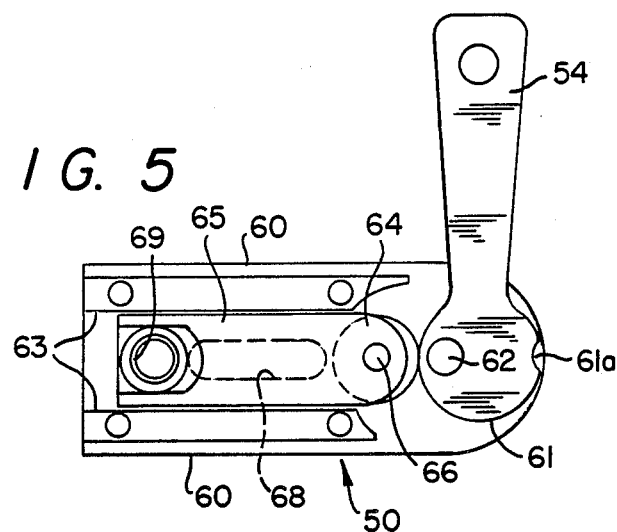
FIG. 5 is an elevational view of a potion of the ringing knife assembly utilized in the preferred embodiment of the present invention.
Figure 6:
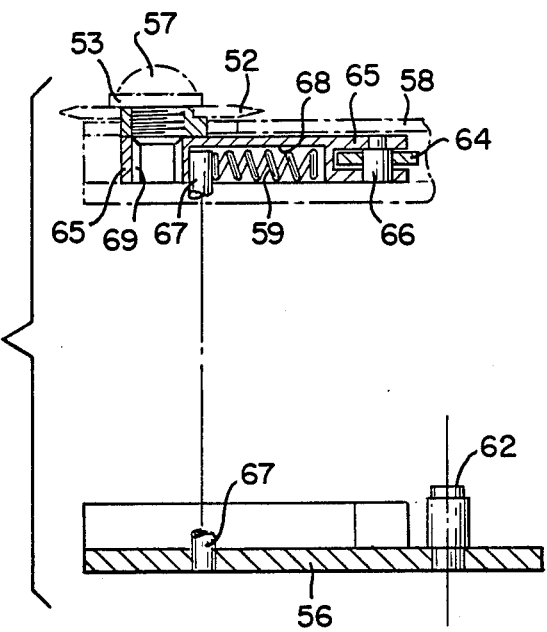
FIG. 6 is a cross-sectional view, partially exploded, of the preferred circular knife blade assembly.
Figure 7:
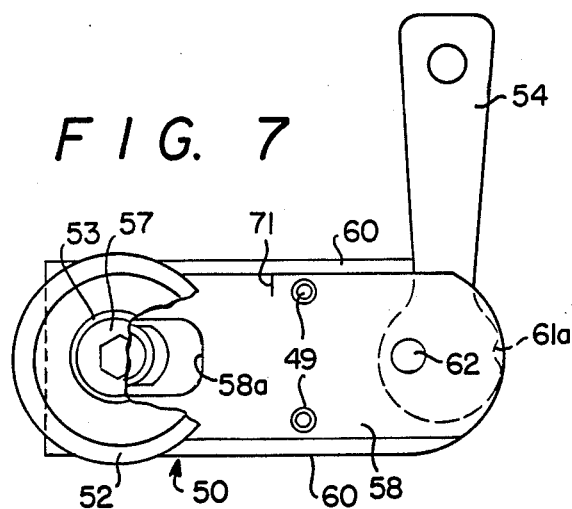
FIG. 7 is a front view, partially cut away, of the preferred circular knife blade assembly of the present invention.
Figure 8:
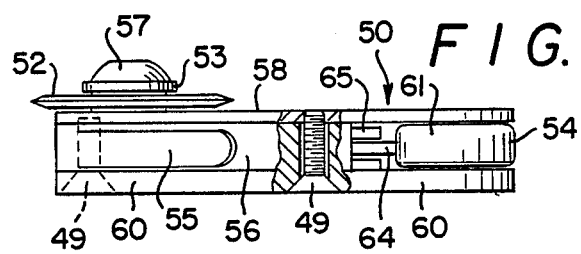
FIG. 8 is a side view, partially cut away and partially in section, of the preferred ringing knife assembly of the present invention.

When ringing knife blade assembly housing 56 is secured in a fixed position on frame 30 by knob 72, the position of circular knife blade 52 mounted on knife holder member 65 may be further adjusted toward and away from cable secured within the tool 20. A cam arrangement is provided to extend and retract the circular knife 52 relative to housing 56. A rotatable roller 64 is mounted by shaft 66 to the end of the holder member 65 opposite that of the circular knife 52. A spring 59 in the interior portion 68 of holder 65 acts against a roll pin 67 mounted in housing 56 to urge or bias the holder and circular knife blade into a retracted position such that roller 64 contacts lever handle 54. Lever 54 is rotatably mounted to housing 56 on offset shaft 62 and includes a cam surface 61 which bears against roller 64. Cam surface 61 is configured so that holder member 65 and knife blade 52 are in the extreme retracted position when lever 54 is in the extreme upward position as shown in FIG. 5 (corresponding to the extreme downward position as shown in FIGS. 1, 3 and 10). When lever 54 is rotated 180° so that the detent portion 61a of cam surface 61 engages roller 64, holder 65 and circular knife blade 52 are pushed against the bias of spring 59 to the extreme extended position toward the cable secured in the tool. An elongated opening 58a in cover plate 58 permits movement of the knife blade screw 57 and circular knife blade 52 between the retracted and the extended positions.

Figure 9:
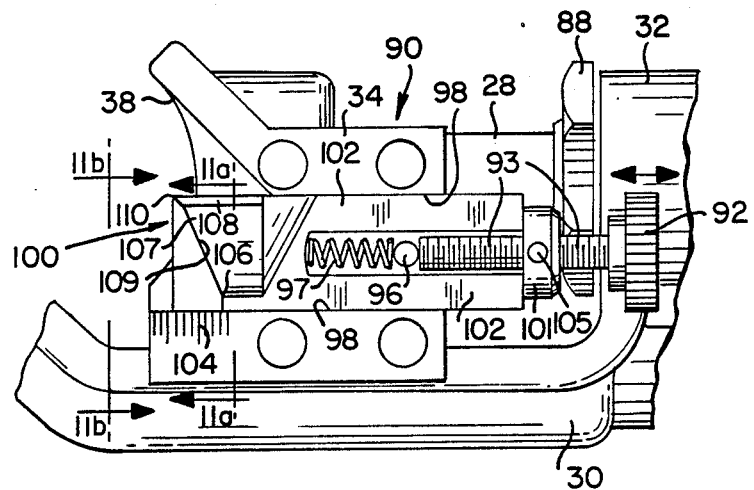
FIG. 9 is an enlarged detail of the insulation stripping assembly portion of the tool depicted in FIG. 1.

To provide the actual stripping of insulation from the cable secured in tool 20, there is provided insulation stripping assembly 90 mounted on adjustable frame member 34 adjacent to jaw face 38. As shown in FIG. 9 with screws 95 and cover plate 94 removed, and in FIGS. 11a, 11b and 12, the insulation stripping assembly includes a cutting knife 100 having a first cutting edge 110 parallel to the longitudinal axis of the cable as secured in a tool, and a second cutting edge 108 along a radial line extending from the cable secured in the tool. Knife 100 is slidingly received within a channel 98 in adjustable frame member 34 and includes a pair of leg members 102 extending in a direction away from the cable position. Between leg members 102 a spring 97 bears against a pin 96 set in adjustable frame 34 (FIG. 12) to urge or bias knife 100 in the direction of the cable position. A rod 93 threaded into the bore of a collar 101 disposed at the end of legs 102 is adjustable toward and away from the cable position to adjust and limit the movement of knife 100 toward cable received in jaw members 36, 38. An adjusting knob 92 set at the far end of threaded rod 93 permits the user to adjust the movement and position of knife 100 by comparing the position of the back edge 106 of the axial cutting edge against indicia 104 marked on adjusting frame member 34. A set screw 105 in end collar 101 permits the user to fix the thread rod 93 and consequently the limit of travel of knife 100 at a fixed position.

Stripping of a width of cable insulation jacket around the periphery of the cable is accomplished by the axial direction cutting edge 110. The angle of axial edge wall 109 permits smooth and easy lifting and removal of the entire thickness of the insulation from the cable conductor so that the stripping of the jacket may proceed in a helical manner (for example, as shown in FIG. 1 of U.S. Pat. No. 3,572,189, the disclosure of which is hereby incorporated by reference). Radial direction cutting edge 108 is angled to advance the entire knife 100 in an axial direction as cutting edge 110 strips the insulation jacket. An angled edge wall 107 provides relief for the portion of the cut made by edge 108. As seen best in FIGS. 11a and 11b, there is provided an angled relief edge 111 along the side edge of front face 112 to insure smooth helical cutting movement as knife 100 engages the cable insulation.

The preferred embodiment of tool 20 as shown is set up for operation by initially adjusting the final cutting positions of both the circular ringing knife 52 and the shaving or stripping knife 100. Where a sample cable is available, thumbscrew 72 is loosened and the circular knife assembly 50 is slid in an outward direction along tool frame channels 35 away from jaw members 36 and 38 to clear circular knife 52 from interference with the cable. The tool jaw members are fully opened by depressing locking lever arm 80 and pulling on both handles 22, 24 to move jaw members 36, 38 apart. The sample cable is then placed between the jaw members 36, 38 and opposing pressure is placed on handles 22, 24 to move the jaw members together and close them fully about the cable sample, as shown in FIG. 10. Circular knife lever 54 is then moved upward to a locked position such that detent 61a on the cam surface engages roller 64. In this position, the circular knife is in a fully extended position relative to the ringing knife assembly 50. The entire ringing knife assembly 50 is moved toward the cable so that the edge of knife 52 is below the surface of the jacket 42, and insulation 44, and at a desired distance away from conductor 46, for example, about 1/16 of an inch. The position of the ringing knife assembly 50 relative to frame 30 is then locked in a fixed position by tightening thumb screw 72 downward. Finally, the circular knife 52 is retracted by moving the circular knife lever 54 180° into a fully retracted position.

The position of stripping blade 100 is set by turning the adjusting thumbscrew 92 to raise or lower the blade to the proper insulation cutting depth, preferably so that the cutting edge 11 is below the level of the cable insulation but spaced away from the largest diameter of the conductors, for example, 1/32 in. The cable may be rotated within the jaws 36, 38 to insure that the cutting edge does not hit the conductors 46. The depth adjustment of knife 100 should be adjusted if necessary.

Where no sample of cable is available but the dimensions of the insulation are known, shaving or stripping knife 100 should be set to a desired depth using indicia 104 on adjustable frame member 34. For example, for 0.250 in. thick insulation, a setting of 0.200 in. will effectively strip the cable insulation without nicking the conductor. To set the blade, use thumb screw 92 and indicia 104 to set the depth of cut of edge 110 to 0.200 in. below the face of jaw member 38.

The ringing knife assembly may also be set up without a sample cable but with known dimensions. After the thumbscrew 72 has been loosened and the ringing knife assembly 50 has been fully retracted away from the jaw members, the cable to be cut is set within the jaws of the tool as described above by pushing the handles 22, 24 toward each other. The circular knife adjustment lever 54 is then moved to the locked position (cam detent 61a engaging roller 64) and the entire assembly 50 is moved toward the cable until the edge of circular blade 52 touches the surface of the cable. At this point, the assembly is locked in position by tightening thumbscrew 72. Circular knife blade 52 is then retracted by moving lever 54 180° to a fully retracted position. Thumbscrew 72 is then loosened to permit the entire circular knife assembly 50 to be moved a desired distance toward the cable slightly less than the thickness of the cable insulation. For example, if the cable insulation is 0.250 in. thick, the circular knife assembly 50 would be moved using indicia 70, 71 a distance of 0.200 in. toward the cable. The entire circular knife assembly 50 is then locked in place by tightening thumbscrew 72.

Once the circular knife 52 and stripping knife 100 have been set up according to either of the above procedures, tool 20 is then ready for operation. After insuring that ringing knife 52 is in a fully retracted position (as shown in FIGS. 5 and 10 for example), the tool is placed on the desired mid-span portion of the cable to be stripped by placing the jaws 36, 38 around the cable and pushing the handles 22, 24 toward each other until the cable is fully seated and secure within the closed jaw members. In the orientation shown in FIGS. 1 and 10, the tool should then be rotated in a clockwise direction around the cable while applying moderate pressure on lever 54 to move circular knife 52 toward and into fully extended position. This pressure on lever 54 moves the circular knife 52 edge into cutting engagement with the cable insulation jacket to create the ringing effect of a closed cut around the complete periphery of the cable. Rotation of the tool should continue while the pressure is applied on lever 54 until the circular knife 52 is in a fully extended position with the cam detent 61a engaged with roller 64. After the ringing or circular knife 52 is locked into its fully extended position cutting into the cable insulation, the tool should continue to be rotated clockwise one additional complete rotation to make sure all of the insulation material has been scored and cut by the knife 52. Preferably, the tool will make at least two complete revolutions before the knife is in the fully extended position to avoid forcing knife 52 to quickly enter the insulation and possibly damaging the tool.

To commence the mid-span shaving or stripping of the cable insulation (without removing the cable from the tool), the direction of tool rotation is reversed to turn in a counterclockwise direction as shown in FIGS. 1 and 10. The biasing action of spring 97 then forces the cutting edges of shaving or stripping knife 100 into the cable insulation. As the tool is rotated in the counter clockwise direction, cutting edges 108 and 110 will bite into the cable insulation and reach the depth limit set by thumbscrew 92 (usually in ½ revolution or less). At this point, cutting edge 110 has served its purpose and essentially no longer provides a cutting function. Lifting surface 109 urges the insulation away from the conductor 46 so that it may be completely cut by edge 108. The thickness of insulation removed is generally greater than the depth of cut of edge 110 set by thumb screw 92 due to the lifting action of surface 109. As the tool is rotated about the cable, it will also be advanced along the axial direction of the cable to helically strip the insulation. The depth of stripping of cable insulation should be checked during rotation and, if adjustment is necessary, thumbscrew 92 should be turned to change the limiting depth of cut of knife 100.

In an alternative use, the tool may be used to shave insulation from the cable, i.e., remove only a portion of the thickness of the insulation to a given diameter. In such use, the stripping knife 100 would be set by thumbscrew 92 so that the blade would be higher (a lesser depth of cut) and edge 110 would continue to cut during counterclockwise rotation of the tool without the full lifting action of surface 109 to leave a shaved insulation surface.

To terminate the insulation shaving or stripping action, the tool should be held back during rotation so that forward axial movement along the cable is stopped. Upon a further complete rotation, the mid-span stripping will be completed. The tool is then removed from the cable by depressing the locking lever 80 while pulling on both handles 22, 24 to open the jaw members sufficiently to remove the cable.

The preferred embodiment of the present invention also provides for simplified replacement of the circular knife 52 and stripping knife 100. In the case of the replacement of the circular knife 52, all that is necessary is that screw button 57 is unscrewed to remove the old blade and insert the new blade. To change stripping knife 100, it is merely necessary to unscrew screws 95 so that cover plate 94 can be removed from the shaving or stripping knife assembly 90. The old stripping knife 100 and spring 97 are removed and thumbscrew 92 is fully backed off toward the right as seen in FIG. 9. The new stripping knife 100 is then inserted in channel 98 in the fully extended position and a new spring 97 is inserted between legs 102. The cover plate 94 is then refitted and the blade 100 is adjusted to the desired position using thumbscrew 92.

Although the invention has been described herein in use to strip a mid-span portion of a wire or cable, it can also be used to strip the end portion of a cable, without use of the circular knife 52.

Thus, the present invention provides a useful tool for shaving or stripping a desired depth and length of cable insulation in fulfillment of the objects listed above. While the invention has been described with reference to specific embodiments, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A tool for removing insulation from conductor cable comprising:
    a frame including a first jaw member;
    a second jaw member slidably mounted on said frame to close and cooperate with said first jaw member to secure said cable therein for rotation of said frame relative to said cable;
    a ringing knife assembly slidably mounted on said frame for movement toward and away from cable secured in said jaw members, including means for releasably securing the ringing knife assembly in a fixed position relative to said frame, said ringing knife blade assembly further including means for extending and retracting a circular knife blade from and to the assembly in its fixed position whereby, upon closure of said jaw members, said ringing knife assembly may be secured in a fixed position with said circular knife blade in a retracted position adjacent to the cable jacket and, upon extension of said circular knife blade and at least one full rotation of said frame in a first direction relative to said cable, said circular knife blade scores said insulation along a closed cut around the complete periphery of said cable; and
    an insulation stripping assembly slidably mounted in said frame for movement along a straight line toward and away from cable secured in said jaw members, said insulation stripping assembly including at least one blade edge and associated adjustable depth limiting means for removing said insulation from said cable, said blade edge being held at a constant, fixed angle relative to the line of movement of said insulation stripping assembly, said insulation stripping assembly being urged by spring means toward said cable from a retracted position when said jaw members are closed whereby, upon rotation of said frame in a second direction, opposite said first direction, relative to said cable, said blade edge strips said insulation from said cable.

2. The tool of claim 1 wherein said insulation stripping assembly includes means to helically strip the insulation as said frame is rotated in said second direction.

3. The tool of claim 1 wherein the line of movement of said insulation stripping assembly blade edge is along a radial line from cable secured in said jaw members.

4. The tool of claim 1 wherein said ringing knife assembly and said insulation stripping assembly are disposed on opposite sides of said frame, relative to cable secured in said jaw members.

5. The tool of claim 1 wherein said ringing knife assembly is located adjacent one of said first or second jaw members and said insulation stripping assembly is located adjacent the other said first or second jaw members.

6. The tool of claim 1 including opposed first and second handle members extending outwardly from said first and second jaw members, respectively, and a releasable lock on said frame for at least one of said handle members, whereby said first and second handle members may be grasped and moved toward each other to close and lock said jaw members around said cable and, upon release of said lock, said first and second handle members may be grasped and moved away from each other to open said jaw members and release said cable.

7. The tool of claim 6 wherein said ringing knife assembly is located adjacent one of said first or second jaw members and said insulation stripping assembly is located opposite said ringing knife assembly, relative to said cable, and adjacent the other of said first or second jaw members.

8. The tool of claim 6 wherein said ringing knife assembly includes a finger-actuated lever operable while a user is grasping said handle members for moving said circular knife blade between retracted and extended positions.

9. The tool of claim 1 further including indicia to determine the position of the circular ringing knife blade and the stripping blade relative to cable secured in the tool.

10. The tool of claim 1 further including a handle associated with each of said jaw members, each of said handles located on opposite sides of said tool along a line extending through the center of cable secured in the jaw members.

11. A hand tool for removing insulation from conductor cable comprising:

a frame;

first and second jaw members on said frame, at least one of said jaw members being slidably mounted on said frame to close and cooperate with the other of said jaw members to secure said cable therein for rotation of said frame relative to said cable;

opposed first and second handle members extending outwardly from said first and second jaw members, respectively, and including a releasable lock for said second handle whereby said handle members may be grasped and moved toward each other to close and lock said cable between said jaw members and, upon release of said locking means, said handle members may be grasped and moved away from each other to release said cable;

a ringing knife assembly slidably mounted on said frame for movement toward and away from cable secured in said jaw members, including means for releasably securing the ringing knife assembly in a fixed position relative to said frame, said ringing knife assembly further including means for extending and reacting a circular knife blade from and to the assembly in its fixed position whereby, upon closure of said jaw members about said cable, said ringing knife assembly may be secured in a fixed position with said circular knife blade in a retracted position adjacent to the cable insulation and, upon extension of said circular knife blade and at least one full rotation of said frame in a first direction relative to said cable, said circular knife blade scores said insulation around the complete periphery of said cable; and an insulation stripping assembly including at least one blade edge for removing the radial thickness of said insulation from said cable, said blade edge being at a constant, fixed cutting angle and mounted for movement along a straight line toward and away from cable secured in said jaw members, and further including adjustable depth limiting means for said blade edge, whereby upon rotation of said frame in a second direction, opposite said first direction, relative to said cable, said blade edge may strip insulation from a conductor in said cable.

12. The tool of claim 11 wherein said handle members are located along a line extending through the center of cable secured in the jaw members.

13. The tool of claim 11 further including indicia to determine the position of the circular ringing knife blade and the stripping blade relative to cable secured in the tool.

14. The tool of claim 11 wherein said ringing knife assembly is located adjacent one of said first or second jaw members and said insulation stripping assembly is located opposite said ringing knife assembly, relative to said cable, and adjacent the other of said first or second jaw members.

15. The tool of claim 11 wherein said ring knife assembly includes a finger-actuated lever operable while a user is grasping said handle members for moving said circular knife blade between retracted and extended positions.

16. The tool of claim 11 wherein said insulation stripping assembly includes means to cut the insulation in a helical direction and helically strip the insulation as said frame is rotated in said second direction.

17. A tool for removing insulation from conductor cable comprising:

a frame including a first jaw member;

a second jaw member slidably mounted on said frame to close and cooperate with said first jaw member to secure said cable therein for rotation of said frame relative to said cable; and an insulation stripping assembly mounted adjacent one of said first or second jaw members for straight line movement toward and away from cable secured in said jaw members, said insulation stripping assembly including a first blade edge for cutting and lifting a radial thickness of said insulation, a second blade edge for cutting said insulation in a helical direction, spring means urging said blade edges toward said cable, and adjustable depth limiting means for said blade edges, said first blade edge being at a fixed cutting angle relative to the line of movement of said insulation stripping assembly, whereby upon rotation of said frame relative to cable secured in said jaw members, said first and second blade edges helically remove said insulation.

18. The tool of claim 17 further including a handle associated with each of said jaw members, each of said handles located on opposite sides of said tool along a line extending through the center of cable secured in the jaw members.

19. The tool of claim 17 further including indicia to determine the position of the insulation stripping blade relative to cable secured in the tool.

20. The tool of claim 18 further including a releasable locking mechanism on said frame for at least one of said handle members.

* * * * *